United States Patent [19]

Fedelem et al.

[11] Patent Number: 4,790,185
[45] Date of Patent: Dec. 13, 1988

[54] FUEL SENDER MOUNT

[75] Inventors: William E. Fedelem; Robert B. Hutter, both of Livonia, Mich.

[73] Assignee: American Motors Corporation, Southfield, Mich.

[21] Appl. No.: 864,192

[22] Filed: May 16, 1986

[51] Int. Cl.[4] .................. G01F 23/00; G01F 23/32
[52] U.S. Cl. ........................... 73/317; 73/305; 73/290 R; 137/565; 280/5 A; 417/361
[58] Field of Search .............. 73/305, 306, 317, 318, 73/290 R; 417/361, 360; 280/5 A, 5 R; 248/188.5, 565, 542, 613, 616, 644, 333; 220/85 B; 222/173, 51, 608; 244/135 B; 137/565, 590

[56] References Cited

U.S. PATENT DOCUMENTS

| | | | |
|---|---|---|---|
| 1,320,607 | 11/1919 | Denison | 222/51 |
| 3,049,010 | 8/1962 | Holderith . | |
| 3,103,375 | 9/1963 | McMullin | 248/188.5 |
| 3,145,965 | 8/1964 | Stein | 248/188.5 |
| 3,193,151 | 7/1965 | Jeep, Jr. et al. | 417/361 |
| 3,240,388 | 3/1966 | Brainard | 73/306 |
| 3,470,907 | 10/1969 | Shockey | 137/558 |
| 3,511,515 | 5/1970 | Cline et al. | 280/5 R |
| 3,822,850 | 7/1974 | Elias | 248/542 |
| 3,910,464 | 10/1975 | Schlanzky | 137/565 |
| 3,968,896 | 7/1976 | Giocoletti et al. | 73/306 |
| 4,116,062 | 9/1978 | Reip . | |
| 4,147,060 | 4/1979 | Fling et al. | 73/318 |
| 4,154,103 | 5/1979 | Fling . | |
| 4,371,181 | 2/1983 | Monigold et al. | 280/5 A |
| 4,569,637 | 2/1986 | Tuckey | 417/360 |
| 4,694,857 | 9/1987 | Harris | 417/360 |
| 4,706,707 | 11/1987 | Betterton et al. | 137/565 |

FOREIGN PATENT DOCUMENTS

| | | | |
|---|---|---|---|
| 2750081 | 5/1979 | Fed. Rep. of Germany | 137/590 |
| 0139528 | 7/1985 | Japan | 280/5 A |
| 0139529 | 7/1985 | Japan | 280/5 A |

Primary Examiner—William A. Cuchlinski, Jr.
Assistant Examiner—Thomas B. Will
Attorney, Agent, or Firm—Brooks & Kushman

[57] ABSTRACT

A fuel sender mount comprises a support rod, a mounting plate secured at one end of the support rod and bolted to the top wall of the fuel tank, a carriage slideably mounted to the support rod and secured to the fuel sender housing and a spring for resiliently urging the carriage downwardly away from the top wall of the tank. The lower end of the carriage is received in a guide socket so that the fuel sender remains fixedly positioned with respect to the fuel tank. The mount is particularly useful in a fuel tank having a resiliently deformable bottom which can be deformed upwardly upon contact with a foreign object. During such contact, the carriage slides along the support rod to prevent puncturing of the bottom wall of the tank, and the force of the contact is not directed against the support rod or the mounting plate with sufficient force to cause the mounting bolts to rip through the top wall of the fuel tank or otherwise rupture the fuel tank. When the bottom returns to its normal shape, the fuel sender is returned to its relatively fixed position within the fuel tank at which the fuel sender fluid inlet communicates with the bottom of the fuel tank and at which a fuel level detector within the fuel sender housing provides an accurate indication of the fluid level in the tank.

17 Claims, 1 Drawing Sheet

FUEL SENDER MOUNT

BACKGROUND OF THE INVENTION

1. Field of the Present Invention

The present invention relates generally to supports for a fuel sending apparatus within a fuel tank, and more particularly, to such a support that maintains the fuel sender in a fixed position relative to the tank and which permits displacement of the sender and support when the tank has been deformed.

2. Description of the Prior Art

Some known fuel sender units are mounted within a vehicle fuel tank. Such units include a housing containing a pump connected between a fluid inlet as well as a fluid outlet which is coupled for fluid communication with a conduit for directing the fuel exteriorly of the tank and toward the engine of the motor vehicle. The support fixedly positions the fuel sender so that the fluid inlet is in fluid communication with the bottom of the tank for access to the entire contents of the tank. In order to facilitate installation of the fuel sender, the top wall of the fuel tank can include an aperture adapted to receive the fuel sender and its support structure, and the support structure is then fixedly entrained between the top wall and the bottom wall of the tank.

It has also been known to mount a level detector within the fuel tank of a motor vehicle. The detector may generate an analog or a digital signal representative of the level of fluid detected in the fuel tank. The signal is then conducted exteriorly of the tank toward a gauge or other indicator appropriately positioned within the driver compartment of the vehicle. Like the fuel sender unit, the detector must be positioned relative to the bottom of the tank so that it effectively measures the level of fluid with respect to the bottom of the tank.

Moreover, it is also possible to install such a device through an opening in the top wall of the tank in order to avoid the need for tightly sealing an opening in a tank surface subjected to substantially greater contact with the fuel in the tank. Since such top wall mountings reduce the risk of leakage from the fuel tank, they may be considered desirable for any apparatus required to be disposed within a fuel tank. As a result, the previously known supports are often rigidly entrained between the top wall and the bottom wall of the tank.

Moreover, fuel tanks are often positioned as close to the ground as possible to maintain a low center of gravity for the vehicle. Such positioning renders them vulnerable to contact with road debris and other foreign obstacles. When the fuel tank is constructed as a relatively rigid structure, the fuel sender support, and thus the fuel sender housing, can be rigidly retained in a fixed position within the housing. Contact of the tank walls with road obstructions or other debris, the objects are merely deflected due to the rigidity of the tank. However, when the contact is severe enough to cause deformation of the tank wall, especially the bottom, the rigid support structure can cause rupturing of the tank walls. In addition, the support mounting structure can be torn apart from the tanks walls and also cause rupturing of the tank.

Moreover, it has been known to construct fuel tanks of a resiliently deformable material. Thus, when the tank walls are subjected to contact with a road obstacle or other debris, the tank wall temporarily deforms and then returns to its original shape. Nevertheless, it will be understood that a rigid support structure for a fuel sender or a fuel level detector entrained between the top and bottom walls of the deformable fuel tank would increase the risk of rupturing the tank walls during deformation and will be undesirable in such a fuel tank.

SUMMARY OF THE PRESENT INVENTION

The present invention overcomes the above-mentioned disadvantages by providing a mount for a fuel sender unit supported within a fuel tank. A fuel sender housing is mounted to a carriage which is displaceable along a support structure secured to one wall of the fuel tank. Preferably, the support structure comprises a support rod secured at one end to the top wall of the tank and having a length shorter than the height of the fuel tank. The fuel sender includes a housing which is secured to a carriage displaceably mounted to the support secured to a tank wall.

In the preferred embodiment, the fuel sender housing contains a pump which is coupled in fluid communication with a fluid inlet for the housing and fluid outlet for the housing. In addition, the housing contains a level detector which detects the level of fluid in the tank and generates a signal corresponding to the level of fluid detected. Nevertheless, it is to be understood that the term "fuel sender" as used in this application is not to be understood as limiting the invention to a structure combining fluid transmission apparatus and level indicators, but is to be understood to encompass either or both types of apparatus as well as other apparatus which require installation in the fuel tank of a motor vehicle. Thus, the mount of the present invention can be employed with any apparatus installed within a fluid tank for sending fluid or signals to a remote location exteriorly of the tank without departing from the scope of the present invention, and the term "fuel sender" is to be understood to encompass such apparatus.

In the preferred embodiment, the carriage comprises a tube having a longitudinal bore dimensioned to slideably receive a support rod suspended from the top wall of the tank. The length of the support rod is shorter than the height of the fuel tank to permit uninhibited deformation of the bottom of the fuel tank. A means for resiliently urging the tube away from the top wall of the tank toward a substantially fixed position at the bottom of the fuel tank is conveniently provided by a spring coiled about the support rod between an end of the tube and a shoulder formed on the support rod. In addition, a boss on the bottom wall of the gas tank includes a socket adapted to fixedly position the tube with respect to the fuel tank, before and after a deformation of the bottom tank wall.

As a result, the present invention provides a fuel sender mount which retains the fuel sender in a substantially fixed position within the fuel tank. However, in the event that the bottom of the fuel tank is deformed as a result of contact with a foreign obstacle, the carriage is slideable along the support rod to avoid resistance to deformation of the fuel tank and thus rupturing of the fuel tank. When the fuel tank returns to its original shape, the fuel sender is automatically returned to its original position. Thus, where the height of the fuel sender with respect to fuel tank is critical, for example, where a level detector must be mounted in a particular orientation with respect to the fuel tank or a fuel sender inlet must communicate with the bottom of the tank, impact with the tank does not effect the accuracy or efficiency of the fuel sender. These and other advantages of the present invention will be more clearly understood upon review of the following detailed description.

BRIEF DESCRIPTION OF THE DRAWING

The present invention will be more clearly understood by reference to the following detailed description of a preferred embodiment when read in conjunction with the accompanying drawing in which like reference characters refer to like parts throughout the views and in which.

DETAILED DESCRIPTION OF A PREFERRED EMBODIMENT

Figure 1:
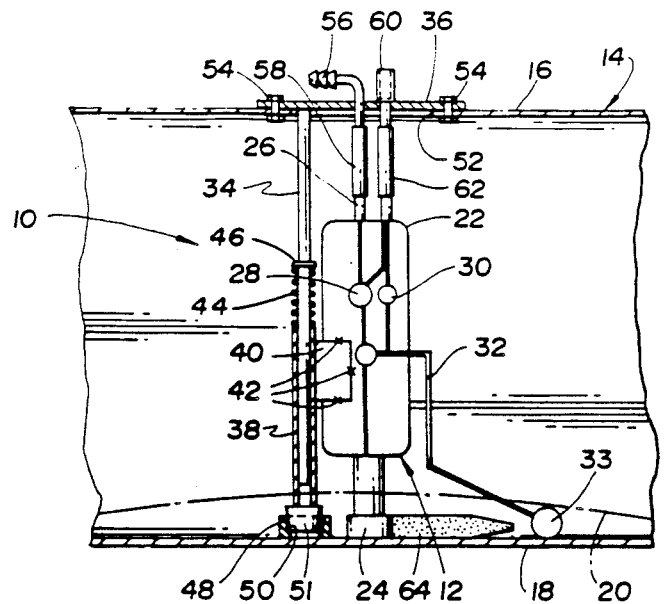
FIG. 1 is a side elevational view of a fuel tank including a fuel sender and mounting assembly constructed in accordance with the present invention.

Referring first to FIG. 1, a mounting assembly 10 according to the present invention is thereshown supporting a fuel sender 12 in a fixed position within the fuel tank 14. The fuel tank 14 includes a top wall 16 and a bottom wall 18 as well as enclosing side walls. Preferably, the entire tank is made of resiliently deformable material. Thus, as indicated in phantom line at 20, the bottom wall 18 can be deformed upon contact with a foreign object, and it returns to its normal position shown in solid line upon removal of the obstruction.

The fuel sender 12 has a housing 22 including a fluid inlet 24 and a fluid outlet 26. The housing contains a pump diagrammatically indicated at 28 which is connected in fluid communication between the inlet 24 and the outlet 26. The housing 22 also contains a fluid level detection means diagrammatically indicated at 30 which generates a signal responsive to the level of fluid detected by a sensor such as the float arm 32.

The mounting assembly 10 includes a support rod 34 adapted to be supported from the top wall 14 of the tank 12 and having a length shorter than the height of the tank from the top wall 14 to the bottom wall 18. In the preferred embodiment, an end of the support rod 34 is secured to a mounting plate 36 to be described in greater detail hereinafter. The other end of the support rod 34 is received in a longitudinal bore of a tube 38 forming a carriage for the fuel sender housing 22. A bracket 40 is secured to the tube and the housing 22 by appropriate means such as the welds 42 to support the housing 22 at a predetermined height above the bottom wall 18 so that the fluid inlet 24 is supported in fluid communication with the bottom of the tank and the level sender arm 32 is at its lowest level when the tank is empty. The tube 38 is also shorter than the height of the tank 14, and is thus slideably entrained along the support rod 34. In addition, a coil spring wrapped around the lower end of the support rod 34 is entrained between the upper end of the tube 38 and a shoulder 46 on the upper part of the rod 34. Accordingly, the tube 38 is resiliently urged downwardly into contact with the bottom of the tank to maintain the fuel sender 12 in its substantially fixed position with respect to the fuel tank 14.

An additional guide for fixedly positioning the carriage with respect to the fuel tank can be provided by a boss 48 mounted to the bottom wall 18 of the tank 14. The boss defines a socket 50 adapted to receive the lower end of the tube 38 so that the fuel sender remains properly aligned while subjected to the movement of fuel and other forces which can occur during operation of the motor vehicle. Preferably, a resilient, apertured plug 51 fits over the bottom of the tube 38 and is received in the socket 50 to eliminate noise due to vibration.

Figure 2:
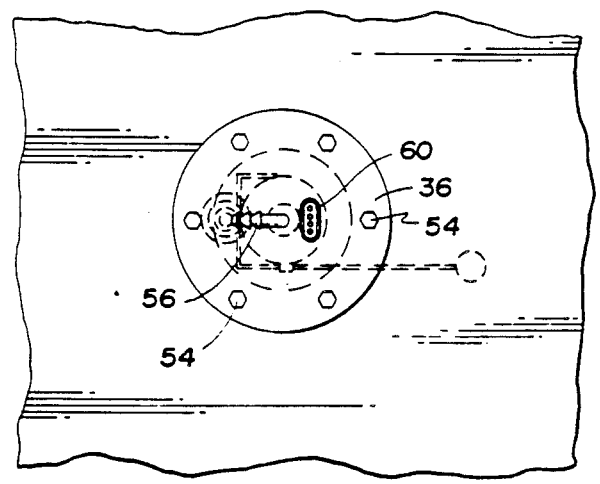
FIG. 2 is a top plan view of the apparatus shown in FIG. 1.

The mounting assembly 10 and the fuel sender 12 are insertable into the tank through an opening 52 in the top wall 16 of the tank 14. The mounting plate 36 is dimensioned to cover the opening 52 and is bolted to the top wall 16 by bolts 54 peripherally spaced about the opening 52. As best shown in FIG. 2, the plate 52 also supports a conventional conduit nipple 56 coupled by a flexible conduit section 58 to the outlet 26 of the fuel sender. In addition, the mounting plate 36 supports an electrical socket 60 coupled by a flexible conductor 62 to having the level detection means 30 for delivery of the level signal exteriorly of the fuel tank. In addition, the socket 60 and conductor 62 also include terminals for connection of the pump 28 to a remote electrical source in a well known manner as diagrammatically indicated in FIG. 1. The socket is preferably compatibl with a harness type connector conventionally used in motor vehicles.

The mounting plate 60 can also support additional couplings for communication with the tank. For example, a fuel return line extending from the engine can be supported by the mounting plate. Such a return line conduit can be conveniently formed in part by making the support rod 34 a tubular member which is mounted within an aperture in the mounting plate.

Referring again to FIG. 1, the inlet 24 includes an elongated filter 64 disposed about the openingin the end of the inlet 24. The filter lies along the bottom of the tank so that the entire contents of the tank can be removed by the pump 28 for use in operating the engine of the vehicle. Moreover, the level detection means 30 is set to register its lowest limit when a float 33 secured to the float arm 32 is in engagement with the bottom wall 18 of the tank 14 and the bottom wall is in its normal position. Since the fuel tank 14 normally retains a relatively fixed shape, the fuel sender 12 is supported in a relatively fixed position with respect to the tank, whereby the fuel sender delivers a continuous supply of fuel from the tank, and the level detector accurately gauges the level of fluid in the tank.

When the resiliently deformable material of the fuel tank 14 is subjected to contact with a foreign obstacle, the carriage tube 38 slides upwardly along the support arm 34 against the pressure of the spring 44 without exerting excessive force upon the fuel sender. Moreover, the full force of contact exerted upon the bottom wall 18 of the fuel tank is not transmitted directly to the mounting plate 36 and thus does not exert sufficient pressure to tear the mounting bolts 54 from their mounting holes in the top of the fuel tank. Furthermore, the bottom of the mounting assembly 10 does not resist upward movement of the bottom wall 18 in a manner which would cause puncturing of the bottom wall 18 as would previously known, rigid fuel sender supports.

Moreover, when the obstruction contacting the bottom wall has been removed, the carriage tube 38 is guided along the support rod 34 as the wall 18 returns to its normal position shown in solid line in FIG. 1. As a result, the fuel sender housing is repositioned at its relatively fixed position within the fuel tank and continuously remains in contact with the bottom wall 18 so that fuel can be delivered to the engine of the vehicle. Moreover, the float 33 is again reset to the level of fluid in the container relative to the normal position of the bottom wall 18 and thus continues to accurately gauge the amount of fuel remaining in the tank. In any event, it will be understood that the inlet 24 of the fuel sender 12 is in constant fluid communication through the nipple 56 with the engine of the vehicle. Likewise, continuous electrical connection between the pump and its power source is maintained and the level detection means continues to generate an accurate fluid level indication after deformation of the fuel tank has been discontinued.

Having thus described the present invention, many modifications thereto will become apparent to those skilled in the art to which it pertains without departing from the scope and spirit of the present invention as defined in the appended claims.

What is claimed is:

1. In combination with a resiliently deformable fuel tank containing a fuel sender having an inlet for fluid communication with the bottom of the tank, the improvement comprising:
   means for displaceably supporting said fuel sender from a top wall of the fuel tank, including means for resiliently urging said fuel sender to a relatively fixed position within said fuel tank at which said inlet is normally retained in a fixed position at the bottom of said tank;
   wherein said top wall and a bottom wall of said fuel tank are resiliently deformable upon impact; and
   wherein said means for displaceably supporting includes means for guiding and repositioning the fuel sender to said relatively fixed position within said fuel tank after deformation of said resiliently deformable tank upon impact, including guide means retained on said bottom wall of said tank for aligning the fuel sender.

2. The invention as defined in claim 1 wherein said means for displaceably supporting comprises a carriage mounted to said fuel sender, at least one support rod mounted to the fuel tank and means for slideably supporting said carriage on said support rod.

3. The invention as defined in claim 2 wherein said carriage comprises a tube having a longitudinal bore dimensioned to slideably receive said support rod.

4. The invention as defined in claim 3 wherein said means for resiliently urging comprises a shoulder on said support rod and a spring positioned intermediate said shoulder and one longitudinal end of said tube.

5. The invention as defined in claim 2 wherein said fuel tank comprises said top wall and said bottom wall which define the height of the tank and further comprising:
   means for securing said at least one support rod with respect to the top of said fuel tank and wherein the length of said at least one support rod is less than the height of said fuel tank.

6. The invention as defined in claim 5 wherein said bottom wall includes a guide boss defining a socket aligned with the axis of said support rod, wherein said socket is dimensioned to receive an end of said carriage.

7. A mounting apparatus for a fuel sender housing in a fuel tank which is entirely resiliently deformable upon impact and having a resiliently deformable top wall and a resiliently deformable bottom wall defining a normally fixed height for the fuel tank, said mounting apparatus comprising:
   means for displaceably supporting the housing in the tank from the top wall of the tank; and
   means for resiliently urging said housing to a relatively fixed position with respect to the bottom wall within said fuel tank, wherein said means for displaceably supporting includes means for guiding and repositioning the fuel sender to said relatively fixed position within said fuel tank after deformation of said resiliently deformable tank upon impact and including guide means retained on said bottom wall of said tank for aligning the fuel sender.

8. The invention as defined in claim 7 wherein said support means comprises a support rod having a length shorter than the height of the fuel tank, means for securing an end of said support rod at said top wall, a carriage mounted to the sender housing, and means for slideably mounting said carriage to said support rod.

9. The invention as defined in claim 8 wherein said carriage comprises a tube having a longitudinal bore dimensioned to slideably receive said support rod.

10. The invention as defined in claim 7 wherein said fuel sender housing includes a fluid inlet and a fluid outlet, and further comprising means for coupling said fluid outlet for fluid communication exteriorly of the fuel tank.

11. The invention as defined in claim 10 wherein said support means comprises a support rod having a length shorter than the height of the fuel tank, means for securing an end of said support rod at said top wall, a carriage mounted to the ender housing, and means for slideably mounting said carriage to said support rod, and
   wherein said means for coupling is integrally formed with said means for securing an end of said support rod.

12. The invention as defined in claim 7 wherein said fuel sender housing includes means for detecting the level of fluid in the fuel tank and having means for generating a signal responsive to the level detected, and further comprising:
   means for conducting said signal exteriorly of the fuel tank.

13. The invention as defined in claim 12 wherein said support means comprises a support rod having a length shorter than the height of the fuel tank, means for securing an end of said support rod at said top wall, a carriage mounted to the sender housing, and means for slideably mounting said carriage to said support rod, and
   wherein said means for conducting is integrally formed with said means for securing an end of said support rod.

14. The invention as defined in claim 12 wherein said support means comprises a support rod having a length shorter than the height of the fuel tank, means for securing an end of said support rod at said top wall, a carriage mounted to the sender housing, and means for slideably mounting said carriage to said support rod, and
   wherein said fuel sender housing includes a fluid inlet and a fluid outlet, and further comprising means for coupling said fluid outlet for fluid communication exteriorly of the fuel tank; and
   wherein said means for coupling is integrally formed with said means for securing an end of said support rod.

15. The invention as defined in claim 7 wherein said support means comprises a support rod having a length shorter than the height of the fuel tank, means for securing an end of said support rod at said top wall, a carriage mounted to the sender housing, and means for slideably mounting said carriage to said support rod, and wherein said fuel tank includes an opening in its top wall dimensioned to receive said support rod and said fuel sender housing, and wherein said means for securing said support rod includes:
a plate secured at said one end of said support rod having a perimeter larger than the perimeter of said opening, and
means for sealing said plate to said top wall about the peripheral of said opening.

16. In combination with a fuel tank made of material resiliently deformable upon impact containing a fuel sender having an inlet for fluid communication with the bottom of the tank, the improvement comprising:
means for displaceably supporting said fuel sender from the top wall of the fuel tank, including means for resiliently urging said fuel sender to a relatively fixed position within said fuel tank at which said inlet is normally retained in a fixed position at the bottom of said tank, and further including means for guiding and repositioning the fuel sender to its relatively fixed position after impat deformation of said resiliently deformable tank;
wherein said means for displaceably supporting comprises a carriage mounted to said fuel sender, at least one support rod mounted to the fuel tank and means for slideably supporting said carriage on said support rod;
wherein said resiliently deformable tank includes a bottom wall which is resiliently deformable upon impact; and
wherein said means for guiding and repositioning includes a guide boss on the bottom wall having a socket aligned with the axis of said support rod, wherein said socket is dimensioned to receive an end of said carriage.

17. The invention as defined in claim 16 wherein said end of said carriage includes aresilient plug and wherein said socket is dimensioned to receive said plug.

* * * * *

UNITED STATES PATENT AND TRADEMARK OFFICE
CERTIFICATE OF CORRECTION

PATENT NO.   :   4,790,185

DATED        :   December 13, 1988

INVENTOR(S)  :   William E. Fedelem and Robert B. Hutter

It is certified that error appears in the above-identified patent and that said Letters Patent is hereby corrected as shown below:

Column 1, line 61, "tanks" should be --tank's--.

Column 4, line 21, "compatibl" should be --compatible--.

Column 4, line 32, "openingin" should be --opening in--.

Column 6, line 29, "ender" should be --sender--.

Column 7, line 15, "peripheral" should be --periphery--.

Column 8, line 18, "aresilient" should be --a resilient--.

Signed and Sealed this

Twenty-second Day of August, 1989

*Attest:*

DONALD J. QUIGG

*Attesting Officer*   Commissioner of Patents and Trademarks